United States Patent
Kumar et al.

(10) Patent No.: US 9,838,584 B2
(45) Date of Patent: Dec. 5, 2017

(54) AUDIO/VIDEO SYNCHRONIZATION USING A DEVICE WITH CAMERA AND MICROPHONE

(71) Applicant: Caavo Inc, Santa Clara, CA (US)

(72) Inventors: Siddharth Kumar, Bangalore (IN); Sharath Hariharpur Satheesh, Bangalore (IN); Ashish Aggarwal, Stevenson Ranch, CA (US)

(73) Assignee: Caavo Inc, Milpitas, CA (US)

( * ) Notice: Subject to any disclaimer, the term of this patent is extended or adjusted under 35 U.S.C. 154(b) by 18 days.

(21) Appl. No.: 14/945,233

(22) Filed: Nov. 18, 2015

(65) Prior Publication Data

US 2016/0150129 A1    May 26, 2016

Related U.S. Application Data

(60) Provisional application No. 62/018,423, filed on Nov. 18, 2014.

(51) Int. Cl.
*H04N 5/225*    (2006.01)
*H04N 17/04*    (2006.01)
*H04N 17/00*    (2006.01)

(52) U.S. Cl.
CPC .......... *H04N 5/2257* (2013.01); *H04N 17/04* (2013.01); *H04N 2017/006* (2013.01)

(58) Field of Classification Search
CPC . H04N 5/2257; H04N 17/04; H04N 2017/006
See application file for complete search history.

(56) References Cited

U.S. PATENT DOCUMENTS

| | | | | |
|---|---|---|---|---|
| 2006/0013565 A1* | 1/2006 | Baumgartner | .......... | H04N 5/04 386/201 |
| 2006/0290810 A1* | 12/2006 | Mallinson | ............... | H04N 5/04 348/515 |
| 2007/0091207 A1* | 4/2007 | Aufranc | ............ | H04N 21/2368 348/462 |
| 2011/0164188 A1* | 7/2011 | Karaoguz | ........... | H04N 5/4403 348/734 |
| 2012/0019633 A1* | 1/2012 | Holley | ..................... | H04N 5/04 348/53 |
| 2014/0354829 A1* | 12/2014 | Cooper | .................... | H04N 5/04 348/194 |
| 2015/0035994 A1* | 2/2015 | Son | ........................ | H04N 17/04 348/189 |

* cited by examiner

*Primary Examiner* — Jason Flohre
(74) *Attorney, Agent, or Firm* — Fiala & Weaver P.L.L.C.

(57) ABSTRACT

Methods, systems, and apparatuses are described for performing a calibration process for synchronizing audio signals with video signals. The calibration process may be performed between one or more devices of an entertainment system and a handheld device. Device(s) (e.g., a television and speaker(s)) of the entertainment system are configured to playback video signal(s) and audio signal(s), respectively. The handheld device is configured to determine an amount of synchronization error between the audio signal and the video signal, determine a synchronization correction value based on the determined amount, and provide the synchronization correction value to device(s) of the entertainment system. The device(s) may use the synchronization correction value to correct the delay between the video signal and the audio signal such that the video signal and the audio signal are synchronized.

20 Claims, 10 Drawing Sheets

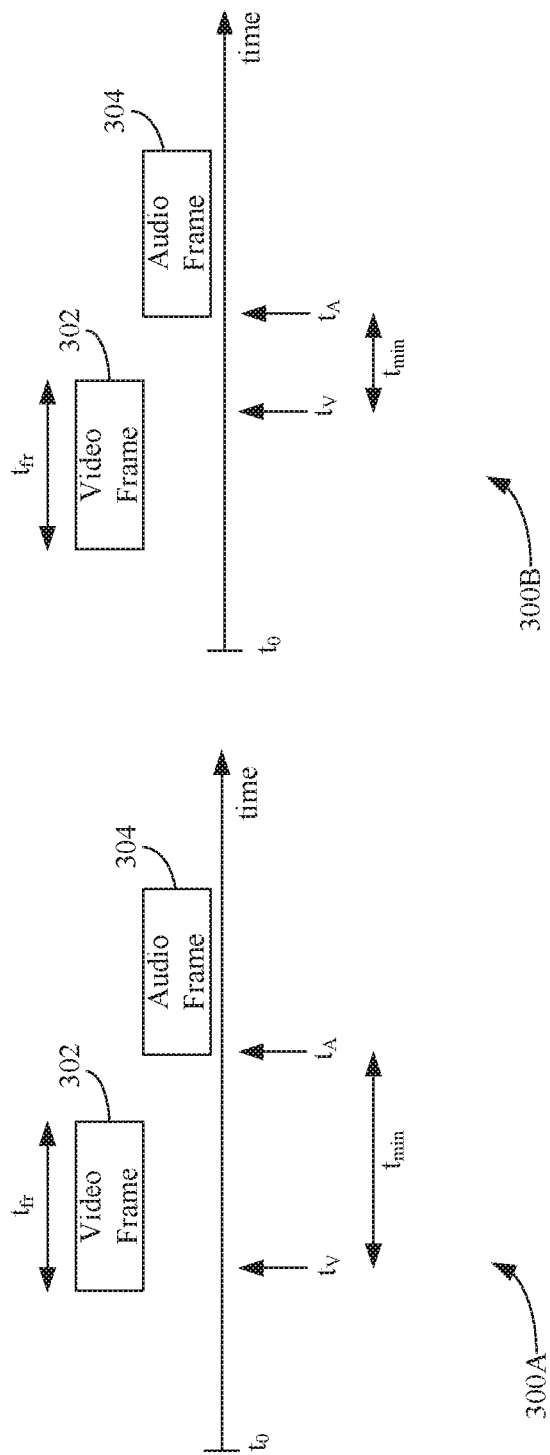

| Iteration # | $t_V$ | $t_A$ | $t_{min} = t_A - t_V$ | $t_{max} = t_{min} + t_{fr}$ | Sync err = $t_{se}$ |
|---|---|---|---|---|---|
| 1 | 580 | 560 | -20 | 10 | $-20 < t_{se} < 10$ |
| 2 | 3645 | 3635 | -10 | 20 | $-10 < t_{se} < 10$ |
| 3 | 6805 | 6810 | 5 | 35 | $5 < t_{se} < 10$ |
| 4 | 9914 | 9920 | 6 | 36 | $6 < t_{se} < 10$ |

| Iteration # | $t_V$ | $t_A$ | $t_{min} = t_A - t_V$ | $t_{max} = t_{min} + t_{fr}$ | Sync err = $t_{se}$ |
|---|---|---|---|---|---|
| 1 | 580 | 560 | -20 | 10 | $-20 < t_{se} < 10$ |
| 2 | 3645 | 3635 | -10 | 20 | $-10 < t_{se} < 10$ |
| 3 | 6845 | 6810 | -35 | -5 | $-10 < t_{se} < -5$ |
| 4 | 9922 | 9920 | -8 | 25 | $-8 < t_{se} < -5$ |

AUDIO/VIDEO SYNCHRONIZATION USING A DEVICE WITH CAMERA AND MICROPHONE

CROSS-REFERENCE TO RELATED APPLICATIONS

This application claims priority to U.S. Provisional Patent Application No. 62/081,423, filed Nov. 18, 2014, the entirety of which is incorporated by reference herein.

This application is also related to the following U.S. Patent Application, which is incorporated by reference herein:

U.S. patent application Ser. No. 14/945,175, filed on even date herewith and entitled "Seamless Setup and Control for Home Entertainment Devices and Content," which claims priority to U.S. Provisional Application No. 62/081,430, the entirety of both of which are incorporated by reference.

BACKGROUND

Technical Field

Embodiment described herein relate to methods, systems, and apparatuses for audio/video synchronization using a device with a camera and a microphone.

Background Art

Audio/video (AV) entertainment systems typically have at least three or four devices connected to a television. These devices may include source devices (i.e., devices configured to transmit an audio and/or video signal (e.g. Blu-ray players, video game consoles, digital media players, a cable/satellite TV set-top box etc.), sink devices (i.e., devices configured to receive an audio and/or video signal such as a TV, a projector, a monitor, speakers, etc.), and/or hub devices (e.g., AV receivers, amplifiers, AV switches, etc.).

A basic requirement for a good viewing and listening experience is that the video content being displayed should be perfectly in sync with the audio content being played back. However, the audio and/or video signals that are transmitted from source devices to sink devices may propagate through different wired and wireless mediums and/or different devices. Furthermore, the audio and/or video signals could carry information in varying formats (encoding formats, compression formats, packaging formats, etc.) due to different hardware/software capabilities of the devices, which may result in different processing durations. All these variables can cause the audio signal to be desynchronized with the video signal (i.e., the audio content and the video content are played back at different times). The phenomenon is commonly referred as "loss of AV synchronization." If AV synchronization deviates greatly, it becomes easily noticeable, degrading the viewing/listening experience, and annoying the user. If the deviation is small and not easily perceivable by the user, it can still strain the user over long periods of viewing.

BRIEF SUMMARY

Methods, systems, and apparatuses are described for audio/video synchronization using a device with a camera and a microphone, substantially as shown in and/or described herein in connection with at least one of the figures, as set forth more completely in the claims.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

FIG. 3 shows timing diagrams illustrating the detection of a test frame that is played back before a test tone in accordance with an embodiment.

FIG. 4 shows a table illustrating iterations of a calibration process in accordance with the scenario of FIG. 3 in accordance with an embodiment.

Embodiments will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

Introduction

Figure 1:
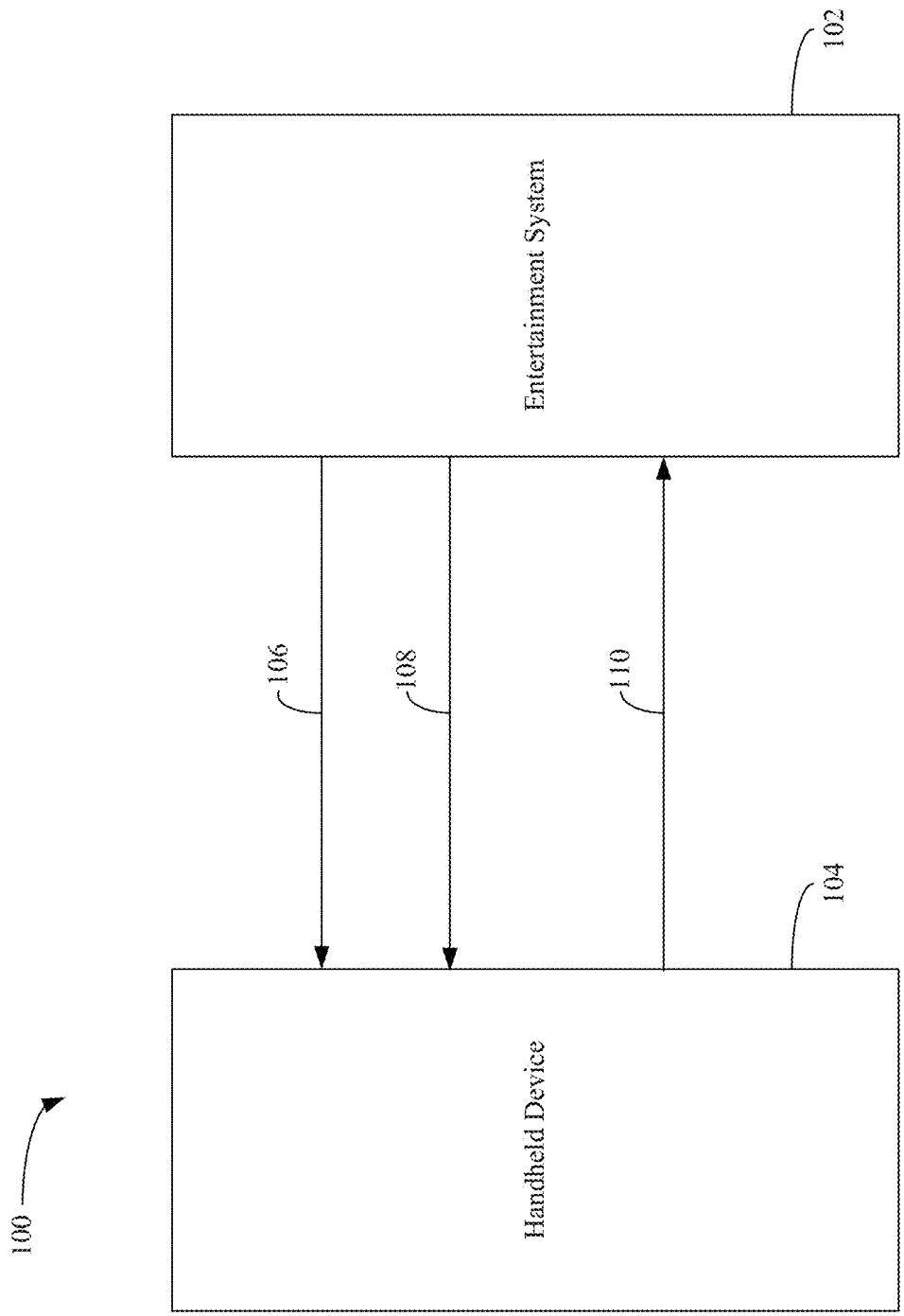
FIG. 1 is a block diagram of a system that is configured to perform a calibration process to synchronize audio signals with video signals in accordance with an embodiment.

The present specification discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used herein, the terms "about," "substantially," and "approximately" are intended to have similar or the same meaning, and these terms may be used interchangeably.

As used herein, the term "sync" may be used to mean "synchronize," "synchronization," and derivatives thereof depending on context.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Numerous exemplary embodiments are described as follows. It is noted that any section/subsection headings provided herein are not intended to be limiting. Embodiments are described throughout this document, and any type of embodiment may be included under any section/subsection. Furthermore, disclosed embodiments may be combined with each other in any manner.

In particular, a method in a handheld device is described herein. In accordance with the method, one or more iterations of a calibration process are performed to obtain a synchronization correction value for synchronizing an audio signal and a video signal. Each of the iteration(s) include determining a first time at which a test frame included in video content representative of the video signal is detected, determining a second time at which a test tone included in audio content representative of the audio signal is detected, and determining the synchronization correction value based on at least the first time and the second time. In further accordance with the method, the synchronization correction value is provided to another device.

A handheld device is also described herein. The handheld device includes a microphone, a camera, and control logic. The control logic is configured to perform iteration(s) of a calibration process to obtain a synchronization correction value for synchronizing an audio signal and a video signal. For each of the iteration(s), the control logic is configured to determine a first time at which a test frame included in video content representative of the video signal is detected by the camera, determine a second time at which a test tone included in audio content representative of the audio signal is detected by the microphone, and determine the synchronization correction value based on at least the first time and the second time. The control logic is further configured to provide the synchronization correction value to another device.

A system is further described herein. The system includes one or more processors and a memory. The memory contains a program, which, when executed by the processor(s), is configured to perform a process configured to perform iteration(s) of a calibration process to obtain a synchronization correction value for synchronizing an audio signal and a video signal. For each of the iteration(s), the control logic is configured to determine a first time at which a test frame included in video content representative of the video signal is detected, determine a second time at which a test tone included in audio content representative of the audio signal is detected, and determine the synchronization correction value based on at least the first time and the second time. The control logic is further configured to provide the synchronization correction value to another device.

Example Embodiments

Embodiments described herein perform a calibration process to synchronize audio signals with video signals. The calibration process may be performed between one or more devices of an entertainment system and a handheld device. Device(s) (e.g., a television and speaker(s)) of the entertainment system are configured to playback video signal(s) and audio signal(s), respectively. The handheld device is configured to determine an amount of synchronization error between the audio signal and the video signal, determine a synchronization correction value based on the determined amount, and provide the synchronization correction value to one or more devices of the entertainment system. The device(s) may use the synchronization correction value to correct the delay between the video signal and the audio signal so that video signal(s) and audio signal(s) transmitted by the device(s) are synchronized.

FIG. 1 is a block diagram of a system 100 that is configured to perform a calibration process to synchronize audio signals with video signals in accordance with an embodiment. As shown in FIG. 1, system 100 includes an entertainment system 102 and a handheld device 104. Entertainment system 102 may comprise a plurality of source devices, one or more hub devices, and a plurality of sink devices. Each of the source devices are configured to provide audio and video signals that are to be played back via one or more sink devices, such that the audio signal(s) is/are broadcast by one or more loudspeakers as sound, and the video signal(s) emanate in the form of light from one or more displays devices in the form of a stream of displayed images (video). The audio and/or video signals may experience delays before being played back due to varying mediums (wired or wireless) in which the audio and video signals are propagated through the various devices of entertainment system 102, and/or the varying processing schemes used by the devices of entertainment system 102 to encode, compress, package, etc. the audio and/or video signals. Thus, when the audio and video signals are played back by the sink device(s), the audio and video signals become desynchronized (i.e., the audio signals and the video signals are not played back so that the broadcast sound is synchronized with the displayed images (e.g., a voice is out of sync with the motions of the speaking person's mouth, etc.)).

Handheld device 104 may be configured to determine an amount of synchronization error between a video signal and an audio signal played back from entertainment system 102. The foregoing may be achieved by performing a calibration process between handheld device 104 and entertainment system 102. During the calibration process, handheld device 104 may be configured to determine a time at which a test frame included in video content 106 (corresponding to the video signal) is detected and a time at which a test tone of audio content 108 (corresponding to the audio signal) is detected. Handheld device 104 may determine that a synchronization error exists if these times are not equal. Handheld device 104 may further be configured to determine one or more synchronization correction values 110 based on these times and provide synchronization correction value(s) 110 to a device (e.g., a source device or a hub device) of entertainment system 102. These device(s) may use synchronization correction value(s) 110 to correct the delay between video signal(s) and audio signal(s) played back by these device after the calibration process is complete (e.g., during normal operation) so that the video signal(s) and audio signal(s) are synchronized.

Examples of handheld device 104 include, but are not limited to, a telephone (e.g., a smart phone and/or a mobile phone), a computer (e.g., a tablet, a laptop, netbook, and/or the like), a remote control device (as disclosed in U.S. patent application Ser. No. 14/945,175, entitled, "Seamless Setup and Control for Home Entertainment Devices and Content," the entirety of which is incorporated by reference herein), etc.

Figure 2:
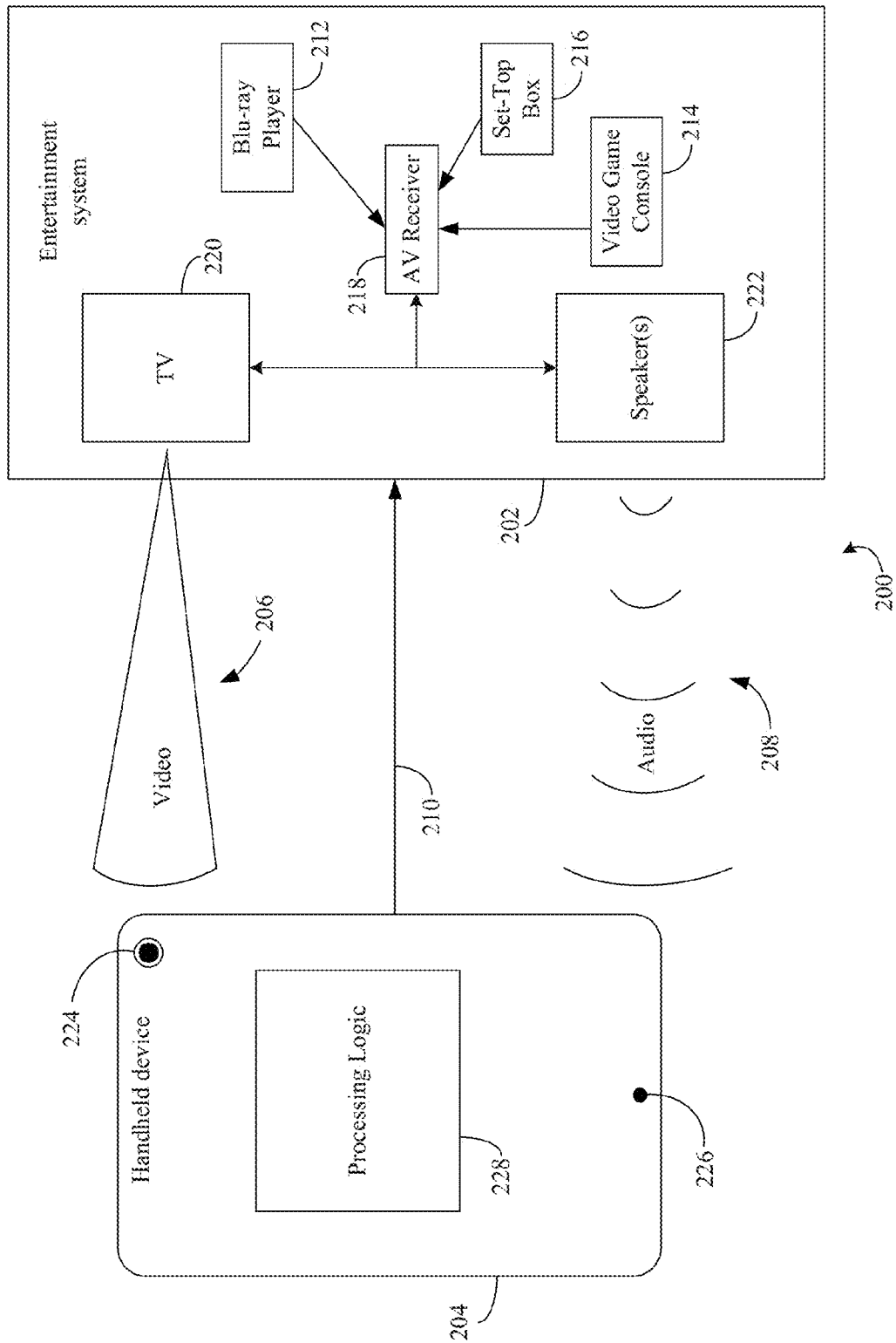
FIG. 2 is a block diagram of a system that is configured to perform a calibration process to synchronize audio signal(s) with video signal(s) in accordance with an embodiment.

FIG. 2 is a detailed block diagram of a system 200 that is configured to perform a synchronization process to synchronize audio signal(s) with video signal(s) in accordance with an embodiment. As shown in FIG. 2, system 200 includes an entertainment system 202 and a handheld device 204. Entertainment system 202 may be an example of entertainment system 102, and handheld device 204 may be an example of handheld device 104, as respectively shown in FIG. 1.

Entertainment system 202 may comprise a plurality of source devices (e.g., a Blu-ray player 212, a video game console 214, and a set-top box 216 such as a cable TV set-top box, a satellite TV set-top box, etc., one or more hub devices (e.g., AV receiver 218), and a plurality of sink devices (e.g., TV 220 and speaker(s) 222). It is noted that the types and/or number of source devices, hub devices, and sink devices described herein are merely for illustrative purposes and that any type and/or number of source devices, hub devices, or sink devices may be used. On such hub device may be a switching device (as disclosed in U.S. patent application Ser. No. 14/945,175, entitled, "Seamless Setup and Control for Home Entertainment Devices and Content," the entirety of which is incorporated by reference herein), etc.

As shown in FIG. 2, entertainment system 202 comprises a plurality of chains of devices, where each chain comprises a path in which audio signals and video signals traverse. For example, a first chain is formed between Blu-ray player 212, AV receiver 218 and TV 220/speaker(s) 222. In this chain, audio and video signals originating from Blu-ray player 212 are provided to and/or processed by AV receiver 218, which in turn provides the video signals to TV 220 and the audio signals to speaker(s) 222 for playback. A second chain is formed between video game console 214, AV receiver 218 and TV 220/speaker(s) 222. In this chain, audio and video signals originating from video game console 214 are provided to and/or processed by AV receiver 218, which in turn provides the video signals to TV 220 and the audio signals to speaker(s) 222 for playback. A third chain is formed between set-top box 216, AV receiver 218 and TV 220/speaker(s) 222. In this chain, audio and video signals originating from set-top box 216 are provided to and/or processed by AV receiver 218, which in turn provides the video signals to TV 220 and the audio signals to speaker(s) 222 for playback. Each of the first chain, the second chain, and the third chain may introduce its own set of delays due to varying mediums (wired or wireless) in which the audio and/or video signals are propagated through the chain, and/or the varying processing schemes used to encode, compress, package, etc. the audio and/or video signals. Thus, a user may experience varying degrees of desynchronization when engaging with an audio and video content via one chain versus another chain.

Handheld device 204 may be configured to determine an amount of synchronization error between the video signal and the audio signal played back by TV 220 and speaker(s) 222 (respectively shown as video content 206 and audio content 208) for each chain formed in entertainment system 202. The foregoing may be achieved by performing a calibration process between handheld device 204 and entertainment system 202. During the calibration process, a source device (e.g., Blu-ray player 212, video game console 214 or set-top box 216) may be configured to transmit a test frame via a video signal and a test tone via an audio signal. The test frame in the video signal is presented by TV 220 (via video content 206), and the test tone in the audio signal is played back by speaker(s) 222 (via audio content 208). The test frame is configured to be accompanied with the test tone. That is, in an ideal system where there is no desynchronization between video content 206 and audio content 208, the test tone should be played back at the same time and for the same duration as the test frame.

During the calibration process, handheld device 204 may be configured to detect the test frame in video content 206 and the test tone in audio content 208 played. Handheld device 204 may comprise a camera 224, a microphone 226, and processing logic 228.

Camera 224 may be configured to capture video (e.g., video content 206) and/or detect the test frame included therein. Processing logic 228 may be configured to determine the time at which the test frame was detected by camera 224. It is noted that camera 224 may capture not just video content 206 being played back by TV 220 (i.e., displayed based on video signal 206), but also the surroundings of TV 220 (e.g., a wall behind TV 220, furniture in the vicinity of 220, a frame or housing of TV 220 that surrounds the screen that plays back the video signal, etc.). The quality of video content 206 captured by camera 224 may be influenced by factors such as lighting, reflections, the angle at which of camera 224 is facing TV 220, etc. In accordance with an embodiment, to mitigate these factors, processing logic 228 may perform image processing to segment the required portion of the captured video (i.e., video content 206) from the surrounding features. In the case where the angle at which camera 224 is facing TV 220 is not optimal (and thereby rendering the test frame undetectable), handheld device 204 may prompt the user to adjust the angle of camera 224 so that camera 224 faces TV 220 with minimum tilt in any direction. In addition, to minimize such adjustments, the test frame and mechanisms to detect the test frame may be configured such that they are invariant to pitch, yaw and roll to a certain degree of tolerance.

Microphone 226 may be configured to capture audio (e.g., audio content 208) and/or detect a test tone included therein. Processing logic 228 may be configured to determine the time at which the test tone was detected by microphone 226. It is noted that the quality of audio content 208 captured by microphone 226 may be affected by noise existing in the environment, acoustic characteristics of the room, etc., in which calibration is being performed. In accordance with an embodiment, to mitigate these factors, handheld device 204 and/or a device included in entertainment system 202 may prompt the user to increase the volume of sound broadcast by speaker(s) 222 to increase the signal-to-noise ratio (SNR) of audio signal 208. If this is not sufficient (i.e., microphone 226 is still unable to detect the test tone), handheld device 204 may apply an audio de-noising scheme to the captured audio signal. In accordance with an embodiment, the audio de-noising scheme may be implemented with a peak filter, which filters out unwanted frequencies.

Continuing with FIG. 2, after determining the time at which the test frame was detected by camera 224 and the time at which the test tone was detected by microphone 226, processing logic 228 may be configured to determine a synchronization correction value. In accordance with an embodiment, processing logic 228 is configured to determine one or more synchronization correction values, each representing a varying degree of correction for a desynchronization error. For example, processing logic 228 may determine a minimum synchronization correction value, which may represent an "aggressive" estimate of the delay between the test frame and the test tone, a maximum synchronization correction value, which may represent "conservative" estimate of the delay between the test frame and the test tone, and a combined synchronization correction value, which represents an "average" or "middle ground" estimate of the delay between the test frame and the test tone. The minimum synchronization correction value may be determined by determining a difference between the time at which the test frame is detected and the time at which the test tone is detected. The maximum synchronization correction value may be determined by combining the determined minimum synchronization correction value with a known duration of the test frame (e.g., 33.33 ms). The combined synchronization correction value may be determined by combining the minimum synchronization correction value and the maximum synchronization correction value. In accordance with an embodiment, the combined synchronization correction value is determined by taking an average of the minimum synchronization correction value and the maximum synchronization correction value. It is noted that this is simply one way of determining the combined synchronization correction value and that other techniques may be used to determine the combined synchronization correction value.

In accordance with an embodiment, processing logic 228 may determine the minimum synchronization correction value, the maximum synchronization correction value and/or the combined synchronization correction value in real time during the calibration process. In accordance with another embodiment, processing logic 228 may determine the minimum synchronization correction value, the maximum synchronization correction value and/or the combined synchronization correction value offline (i.e., subsequent to the calibration process completing).

Handheld device 204 may be configured to transmit any or all of the minimum synchronization correction value, the maximum synchronization correction value or the combined synchronization correction value (shown as synchronization correction value(s) 210) to the source device (e.g., Blu-ray player 212, video game console 214 or set-top box 216) from which video content 206 and audio content 208 originated and/or any hub device(s) (e.g., AV receiver 218) through which the corresponding video signal and audio signal are propagated. The source device and/or the hub device(s) may select one of the received minimum synchronization correction value, the maximum synchronization correction value or the combined synchronization correction value and set one or more delay parameter that cause video signal(s) and/or audio signal(s) to be delayed (e.g., buffered) for a duration corresponding to and/or based on the selected synchronization correction value. Due to the inserted delay(s), the audio signal and video signal will be played back in a synchronized manner by TV 220 and speakers 222 during normal operation. After synchronization correction value(s) 210 are determined for a particular source device, the calibration process may be repeated for another source device.

In accordance with one or more embodiments, the synchronization correction value selected by the source device and/or hub device(s) is user-selectable.

In accordance with one or more embodiments, the selected synchronization correction value is used to delay audio signal(s) with respect to video signal(s) to compensate for the travel time of the sound waves of audio signal(s). Because sound waves are slower than light, audio signal(s) and video signal(s) (after calibration) may still be perceived to be desynchronized by the time the audio signal(s) and the video signal(s) reach the user. Adding the slight delay in the audio signal(s) may rectify this issue and will result in a more realistic viewing/listening experience. In accordance with another embodiment, the selected synchronization correction value is used to slightly delay the video signal(s) with respect to the audio signal(s) to achieve the same effect as described above.

In accordance with one or more embodiments, in lieu of transmitting synchronization correction value(s) 210 to the source device and/or hub device(s) of entertainment system 202, handheld device 204 transmits the determined time at which the test frame of video content 206 is detected and the determined time at which the test tone of audio content 208 is detected. In accordance with such an embodiment, the source device and/or the hub devices(s) determine any or all of the minimum synchronization correction value, the maximum synchronization correction value or the combined synchronization correction value.

In accordance with one or more embodiments, the test frame may comprise an easily-detectable image, such as a binary image that comprises a vertically-aligned first section and second section (e.g., side-by-side), where the first section comprises the color white, and the second section comprises the color black. Processing logic 228 may be configured to detect such an image using histogram and vertical gradient calculations. The histogram may have two peaks, each corresponding to the black and white intensities. The vertical gradient calculation may assist with the identification of the presence of the edge between the black and white regions.

In accordance with one or more embodiments, the test tone is a sine tone that is played back for the same duration at which the test frame is played back. Assuming a silent environment, a sound level detector may be used to detect the test tone. Frequency detection schemes (e.g., Fast Fourier Transform-based techniques) that are known in the art may also be used to detect the test tone.

It is contemplated that other techniques for detecting the test frame and/or test tone and that other images and/or audio may be used during calibration, and the examples given above are illustrative in nature and non-limiting.

In accordance with an embodiment, the calibration process may begin upon executing a program (e.g., software application) on handheld device 204. The program may transmit a control signal to a particular source device that causes the source device to begin playback of the test frame and test signal. Camera 224 and microphone 226 may be activated before playback begins to ensure accurate detection times for the test frame and the test tone. In accordance with another embodiment, the calibration process may be initiated via the source device. For example, a user may interact with a button on the source device, a remote control associated with the source device, and/or a menu option provided via the source device that causes the calibration process to be initiated. Similar to the handheld-device initiated process, camera 224 and microphone 226 may be activated before playback begins.

The time at which the test frame is detected by camera 224 may play an important role in the calibration process. This is especially true for the case of video data, where the sampling rate of video data is much lower than the sampling rate for audio. Camera 224 may detect the test frame at any instance within the frame period of the test frame, whereas microphone 226 may detect the test tone at or near the beginning of the frame period due to the faster sampling rate. The delay determined between audio content 208 and video content 206 may be influenced by this particular sampling instant. The ideal case would be where camera 204 detects the test frame at the exact instant when the test frame is displayed by TV 220. In such a case, the measured delay between the start of the test frame and the test tone gives a direct indication of the synchronization error (i.e., the time difference between when the test frame is played back and when the test tone is played back). Other cases may not provide as accurate of an estimate of the delay, as the delay in the sampling instant should be accounted for. In accordance with embodiments, this may be handled by performing multiple iterations of the calibration process, wherein during each iteration, the test frame and the test tone are played back (e.g., from a particular source device) for the same duration. This may ensure that the sampling instant of the test frame varies from one iteration to another, thereby providing more information about the timing to refine synchronization correction value(s) 210.

It has been observed that one of three conditions may occur when detecting the test frame and the test tone: 1) the test frame is detected before the test tone is detected, where the test frame is played back before the test tone is played back; 2) the test tone is detected before the test frame is detected, where the test frame is played back before the test tone; and 3) the test tone is detected before the test frame is detected, where the test tone is played back before the test frame. The first condition is described with reference to FIGS. 3 and 4. The second condition is described with reference to FIGS. 5 and 6. The third condition is described with reference to FIGS. 7 and 8.

Referring now to FIG. 3, FIG. 3 shows timing diagrams 300A and 300B illustrating the detection of a test frame and a test tone in accordance with the first condition described above, according to one or more embodiments. As shown in timing diagram 300A, the time at which the test frame (i.e., video frame 302) is detected (i.e., $t_v$) is near the start of the frame duration ($t_{fr}$) of video frame 302. The time at which audio frame 304 is detected is represented as $t_A$. Accordingly, the minimum possible delay between video frame 302 and audio frame 304 may be determined in accordance with Equation 2, which is shown below:

$$t_{min} = t_A - t_v \quad \text{(Equation 1)}$$

where $t_{min}$ corresponds to the minimum possible delay between video frame 302 and test tone 304. The minimum synchronization correction value is equal to $t_{min}$.

However, as described above, video frame 302 may be detected any time during its frame duration ($t_{fr}$) (e.g., at the beginning of its frame duration (as shown in timing diagram 300A of FIG. 3), in the middle of its frame duration, or at the end of its frame duration (as shown in timing diagram 300B of FIG. 3)). To account for this, a maximum possible delay amount is determined by combining (e.g., adding) the known frame duration ($t_{fr}$) of video frame 302 with $t_{min}$. For example, the maximum possible delay amount between video frame 302 and audio frame 304 may be determined in accordance with Equation 2, which is shown below:

$$t_{max} = t_{min} + t_{fr} \quad \text{(Equation 2)}$$

where $t_{max}$ corresponds to the maximum possible delay between test frame 302 and test tone 304. The maximum synchronization correction value is equal to $t_{max}$.

Accordingly, a range of possible synchronization correction values is determined, where the boundaries of the range are defined by $t_{min}$ and $t_{max}$.

As described above, multiple iterations of the calibration process may be performed to refine and narrow these boundaries. The refined lower boundary (i.e., $t_{min}$) may be equal to the maximum $t_{min}$ value obtained from all the iterations, and the refined upper boundary ($t_{max}$) may be equal to the minimum $t_{max}$ value obtained from all the iterations. The synchronization correction values determined by the range defined by $t_{min}$ and $t_{max}$ tend to become smaller and smaller (or at the most, stay the same) with each subsequent iteration. Thus, the higher the number of iterations, the more accurate an estimate of the synchronization error amount. The lower boundary of the range (i.e., $t_{min}$) corresponds to an aggressive estimate, the upper boundary of the range (i.e., $t_{max}$) corresponds to a conservative estimate, and a value between the lower and upper boundaries corresponds to an average or middle ground estimate.

FIG. 4 shows a table 400 illustrating how the boundaries of the synchronization correction values are refined in accordance with an embodiment. The values shown are based on an exemplary video frame duration (i.e., $t_{fr}$) of 30 ms. It is further noted that only four iterations are shown for sake of brevity and that any number of iterations of the calibration process may be performed.

As shown in FIG. 4, during a first iteration 402, the time at which video frame 302 is detected is 510 ms, and the time at which audio frame 304 was detected is 580 ms. Accordingly, $t_{min}$ is equal to 70 ms, and $t_{max}$ is equal to 100 ms. Thus, the range of possible synchronization correction values ($t_{se}$) is equal to 70 ms to 100 ms. During a second iteration 404, the time at which video frame 302 is detected is 3645 ms, and the time at which audio frame 304 is detected is 3700 ms. Accordingly, $t_{min}$ is equal to 55 ms, and $t_{max}$ is equal to 85 ms. In this iteration, because $t_{max}$ is less than the $t_{max}$ determined in the first iteration, $t_{max}$ from the second iteration is used for the upper boundary of the possible range of synchronization correction values. Accordingly, the range of synchronization correction values is now equal to 70 ms to 85 ms. During a third iteration 406, the time at which video frame 302 is detected is 6735 ms, and the time at which audio frame 304 is detected is 6810 ms. Accordingly, $t_{min}$ is equal to 75 ms, and $t_{max}$ is equal to 105 ms. In this iteration, because $t_{min}$ is greater than the $t_{min}$ determined during the previous iterations (i.e., first iteration 402 and second iteration 404), the determined during third iteration 406 is used for the lower boundary of the possible range of synchronization correction values. Accordingly, the range of synchronization correction values is now equal to 75 ms to 85 ms. During a fourth iteration 408, the time at which video frame 302 is detected is 9840 ms, and the time at which audio frame 304 is detected is 9920 ms. Accordingly, $t_{min}$ is equal to 80 ms, and $t_{max}$ is equal to 110 ms. In this iteration, because $t_{min}$ is greater than the $t_{min}$ determined during the previous iterations (i.e., first iteration 402, second iteration 404, and third iteration 406), the $t_{min}$ from fourth iteration 408 is used for the lower boundary of the possible range of synchronization correction values. Accordingly, the range of possible synchronization correction values is now equal to 80 ms to 85 ms.

Accordingly, the range of possible synchronization correction values become smaller and smaller as the number of iterations performed for the calibration process increases.

As described above, handheld device 202 may be configured to provide a synchronization correction value(s) 210 to source device(s) and/or hub device(s) of entertainment system 202 to correct a delay between the test frame and the test tone, where the minimum synchronization correction value may be equal to $t_{min}$ and the maximum synchronization correction value may be equal to $t_{max}$. Handheld device 202 may also provide a combined synchronization correction value based on a combination of $t_{min}$ and $t_{max}$. In accordance with an embodiment, the combined synchronization correction value is determined by taking an average of $t_{min}$ and $t_{max}$. It is noted that this is simply one way of determining the combined synchronization correction value and that other techniques may be used to determine the combined synchronization correction value.

As also described above, the time at which a test frame is detected may be after the time at which the test tone is detected. This may imply two possibilities: 1) the test frame may have been played back before the test tone, but the test frame was detected after the test tone was detected (referred to as the second condition above); or 2), the test frame actually was delayed compared to the test tone (i.e., the test frame was played back after the test tone was played back) (referred to as the third condition above).

Figures 5, 6:
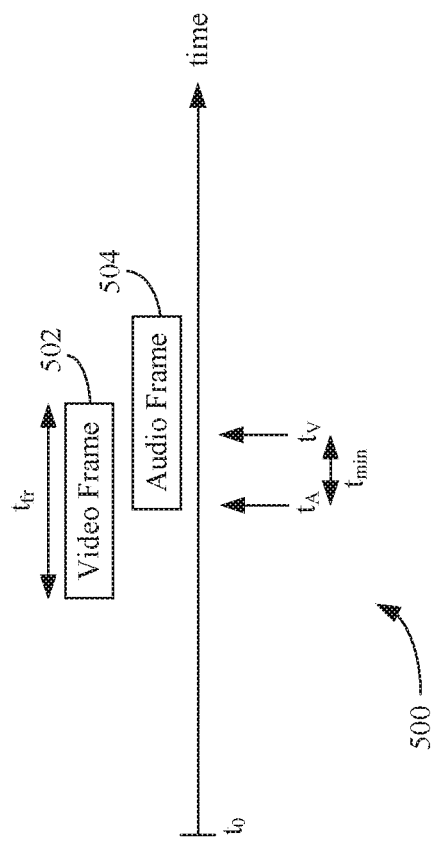
FIG. 5 shows a timing diagram illustrating the detection of a test frame after the detection of a test tone, wherein the test frame is played back before the test tone in accordance with an embodiment.
FIG. 6 shows a table illustrating iterations of the calibration process in accordance with the scenario of FIG. 5 in accordance with an embodiment.

The first possibility is shown in FIG. 5. For example, FIG. 5 shows a timing diagram 500 illustrating the detection of a test frame (video frame 502) after detection of a test tone (audio frame 504), wherein the test frame is played back before the test tone. In particular, audio frame 504 is detected at time $t_A$ and video frame 502 is detected at time $t_v$, which occurs after $t_A$. Data collected from multiple iterations of the calibration process may be used to determine with certainty whether or not video frame 502 was played back before audio frame 504. For example, during a particular iteration, video frame 502 may be detected at a time that is before a time at which audio frame 504 is detected.

FIG. 6 shows a table 600 illustrating iterations of the calibration process in accordance with the scenario described above in FIG. 5 in accordance with an embodiment. The values shown are based on an exemplary video frame duration of 30 ms. It is further noted that only four iterations are shown for sake of brevity and that any number of iterations of the calibration process may be performed.

As shown in FIG. 6, during a first iteration 602, the time at which video frame 502 is detected is 580 ms, and the time at which audio frame 504 was detected is 560 ms. Accordingly, $t_{min}$ is equal to −20 ms (thereby indicating that audio frame 504 was detected before video frame 502 was detected). During a second iteration 504, the time at which video frame 502 is detected is 3645 ms, and the time at which audio frame 504 is detected is 3635 ms. Accordingly, $t_{min}$ is equal to −10 ms. After first iteration 602 and second iteration 604, it is still not clear whether audio frame 504 was played back before video frame 502, or whether video frame 502 was played back before audio frame 504, but was detected after audio frame 504 was played back. As shown in FIG. 6, this ambiguity is resolved in a third iteration 506, where the time at which video frame 502 is detected (i.e., 6805 ms) is prior to the time at which audio frame 504 is detected (i.e., 6810 ms).

As further shown in FIG. 6, the range of possible synchronization correction value(s) become smaller and smaller as the number of iterations performed for the calibration process increases in a similar manner as described above with reference to FIG. 4.

Figures 7, 8:
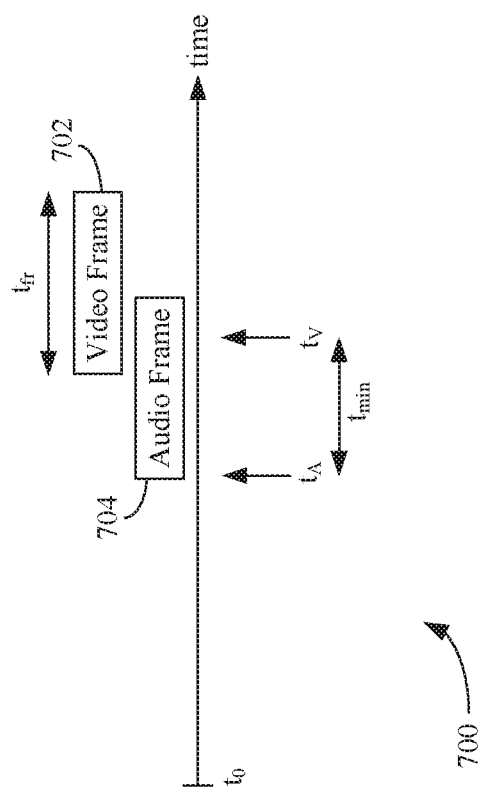
FIG. 7 shows a timing diagram illustrating the detection of a test frame after the detection of a test tone, wherein the test frame was played back after the test tone was played back in accordance with an embodiment.
FIG. 8 shows a table illustrating iterations of the calibration process in accordance with the scenario of FIG. 7 in accordance with an embodiment.

The second possibility described above is shown in FIG. 7. FIG. 7 shows a timing diagram 700 illustrating the detection of a test tone (audio frame 704) before the detection of a test frame (video frame 702), wherein the test frame was played back after the test tone was played back in accordance with an embodiment. In particular, audio frame 704 is detected at time $t_A$ and video frame 702 is detected at time $t_v$ (which occurs after $t_A$), but audio frame 704 is played back before video frame 702. Data collected from multiple iterations of the calibration process may be used to determine with certainty whether or not audio frame 704 was played back before video frame 702. For example, during a particular iteration, if video frame 702 is detected after audio frame 704 more than a period of time that corresponds to the duration of video frame 302 (i.e., $t_{fr}$), then it may be inferred that audio frame 704 was played back before video frame 702.

FIG. 8 shows a table 800 illustrating iterations of the calibration process in accordance with the scenario described above in FIG. 7 in accordance with an embodiment. The values shown are based on an exemplary video frame duration of 30 ms. It is further noted that only four iterations are shown for sake of brevity and that any number of iterations of the calibration process may be performed.

As shown in FIG. 8, during a first iteration 802, the time at which video frame 802 is detected is 580 ms, and the time at which audio frame 704 was detected is 560 ms. Accordingly, $t_{min}$ is equal to −20 ms (thereby indicating that audio frame 704 was detected before video frame 702 was detected). During a second iteration 804, the time at which video frame 702 is detected is 3645 ms, and the time at which audio frame 704 is detected is 3635 ms. Accordingly, $t_{min}$ is equal to −10 ms. After first iteration 802 and second iteration 804, it is still not clear whether audio frame 704 was played back before video frame 702, or whether video frame 702 was played back before audio frame 704, but was detected after audio frame 704 was played back. As shown in FIG. 8, this ambiguity is resolved in a third iteration 806, where $t_{min}$ (i.e., the difference between the time at which video frame 702 and audio frame 704 is detected) is more than the duration of video frame 704. That is, the absolute value of $t_{min}$ (i.e., 35 ms) is greater than $t_{fr}$ (i.e., 30 ms). This clearly implies that audio frame 704 was played back before video frame 702.

It is noted that the ambiguity-resolving iteration may never occur. This occurrence, though not likely, is still possible and may lead to an incorrect estimate of the amount of delay between video frame 702 and audio frame 704. To minimize this, the combined synchronization correction value (based on a combination of $t_{min}$ and $t_{max}$) may be used to correct the delay.

As further shown in FIG. 8, the range of possible synchronization correction values become smaller and smaller as the number of iterations performed for the calibration process increases in a similar manner as described above with reference to FIG. 4.

In accordance with an embodiment, each iteration of the calibration process may be spaced apart by a random duration (i.e., the time between each iteration may be randomly determined). In accordance with another embodiment, the duration between each iteration is based at least on the maximum synchronization correction value. In accordance with such an embodiment, because the maximum possible delay between the video signal and the audio signal are known, it is not required to wait more than this maximum possible delay before starting the next iteration.

The entire duration of the calibration process may depend on the number of iterations and the duration between each iteration. For example, suppose that the duration of the test frame and the test tone is equal to one second, the duration between each iteration is equal to two seconds, and the number of iterations is equal to ten seconds. In this example, the entire duration of the calibration process is equal to 30 seconds. The entire duration may be reduced by basing the duration between each iteration on the maximum synchronization correction value as described above.

Example Operational Embodiments

Figure 9:
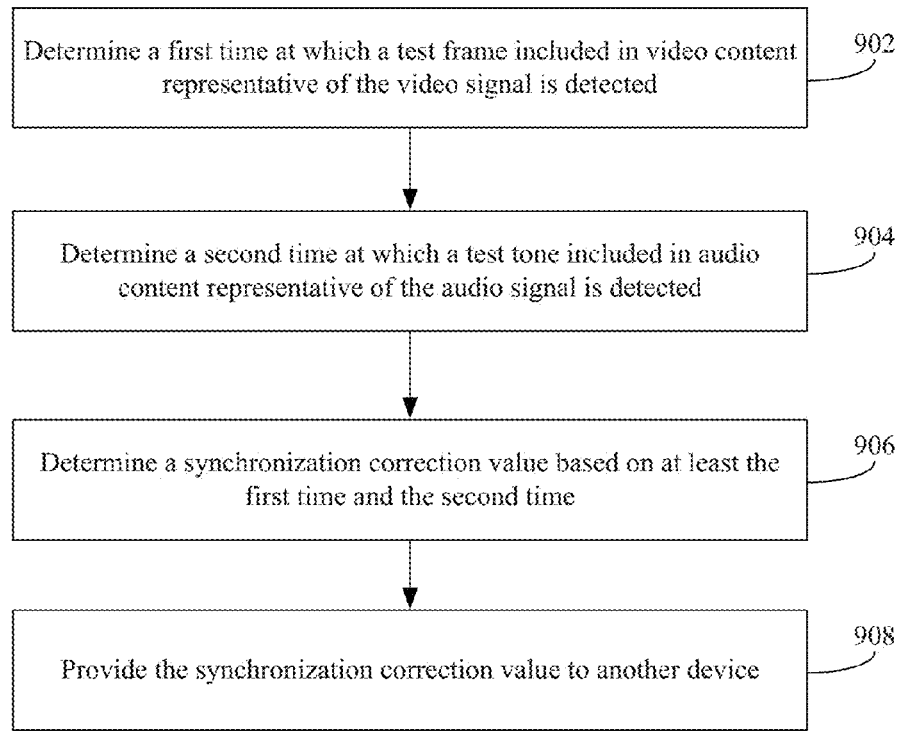
FIG. 9 shows a flowchart of a method for performing one or more iterations of a calibration process to obtain a synchronization correction value for synchronizing an audio signal and a video signal in accordance with an embodiment.
Figure 10:
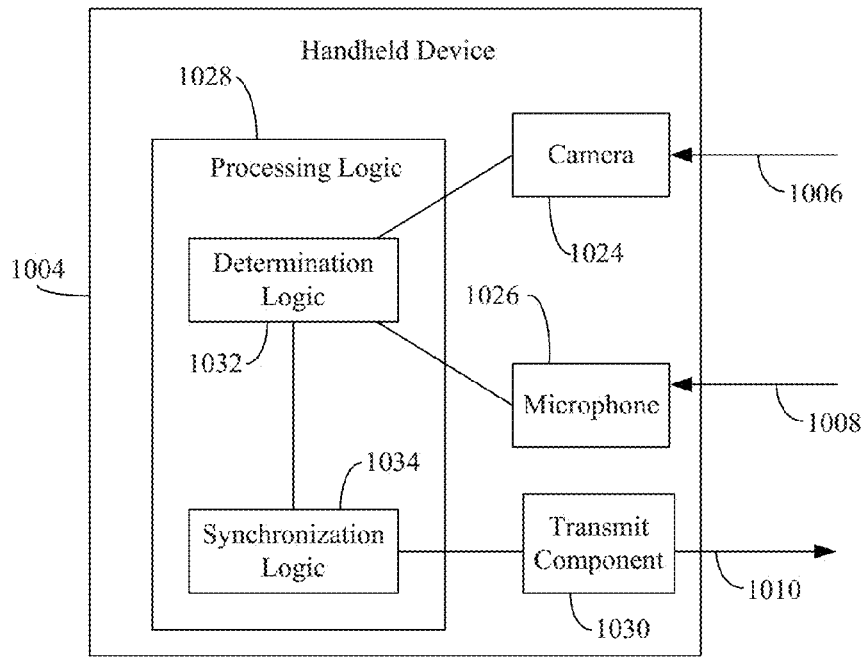
FIG. 10 depicts a block diagram of a handheld device in accordance with an embodiment.

Accordingly, in embodiments, a calibration process may be performed to synchronize audio signals with video signals in many ways. For instance, FIG. 9 shows a flowchart 900 of a method for performing one or more iterations of a calibration process to obtain a synchronization correction value for synchronizing an audio signal and a video signal in accordance with an embodiment. The method of flowchart 900 may be implemented by handheld device 1004 shown in FIG. 10. FIG. 10 depicts a block diagram 1000 of handheld device 1004 in accordance with an embodiment. Handheld device 1004 may be an example of handheld device 204, as shown in FIG. 2. As shown in FIG. 10, handheld device 1004 includes a camera 1024, a microphone 1026, processing logic 1028, and a transmit component 1030. Camera 1024 may be an example of camera 224, microphone 1026 may be an example of microphone 226, and processing logic 1028 may be an example of processing logic 228, as shown in FIG. 2. Processing logic 1028 may include determination logic 1032 and synchronization logic 1034. Other structural and operational embodiments will be apparent to persons skilled in the relevant art(s) based on the following discussion regarding flowchart 900 and handheld device 1004.

Flowchart 900 begins with step 902. At step 902, for each of the one or more iterations, a first time at which a test frame included in video content representative of the video signal is detected. For example, with reference to FIG. 10, determination logic 1032 may be configured to determine a first time at which a test frame included in video content 1006 representative of the video signal is detected. Video content 1006 may be an example of video content 206, as shown in FIG. 2. In accordance with one or more embodiments, the test frame included in video content 1006 is detected by camera 1024.

At step 904, for each of the one or more iterations, a second time at which a test tone included in audio content representative of the audio signal is detected. For example, with reference to FIG. 10, determination logic 1032 may be configured to determine a second time at which the test tone included in audio content 1008 representative of the audio signal is detected. Audio content 1008 may be an example of audio content 208, as shown in FIG. 2. In accordance with one or more embodiments, the test tone included in audio content 1008 is detected by microphone 1026.

In accordance with one or more embodiments, the video signal and the audio signal originate from a same source (e.g., a source device, such as Blu-ray player 212, video game console 214, or set-top box 216, as shown in FIG. 2).

In accordance with one or more embodiments, the duration of the test tone included in audio content 1008 is the same as a duration of the test frame included in video content 1006.

At step 906, for each of the one or more iterations, a synchronization correction value based on at least the first time and the second time is determined. For example, with reference to FIG. 10, synchronization logic 1034 determines the synchronization correction value based on at least the first time and the second time.

At step 908, the synchronization correction value is provided to another device. For example, with reference to FIG. 10, transmit component 1030 provides synchronization correction value 1010 to another device. The other device may be a source device or hub device(s) of an entertainment system (e.g., entertainment system 202, as shown in FIG. 2). In accordance with an embodiment, transmit component 1030 provides synchronization correction value 1010 to another device via a wired connection (e.g., via a Universal Serial Bus (USB) cable, a coaxial cable, etc.). In accordance with another embodiment, transmit component 1030 provides synchronization correction value 1010 to another device via a wireless connection (e.g., via infrared (IR) communication, Bluetooth™, ZigBee®, NFC, IEEE 802.11-based protocols, etc.).

In some example embodiments, one or more of operations 902, 904, 906 and/or 908 of flowchart 900 may not be performed. Moreover, operations in addition to or in lieu of operations 902, 904, 906 and/or 908 may be performed. Further, in some example embodiments, one or more of operations 902, 904, 906 and/or 908 may be performed out of order, in an alternate sequence, or partially (or completely) concurrently with each other or with other operations.

Figure 11:
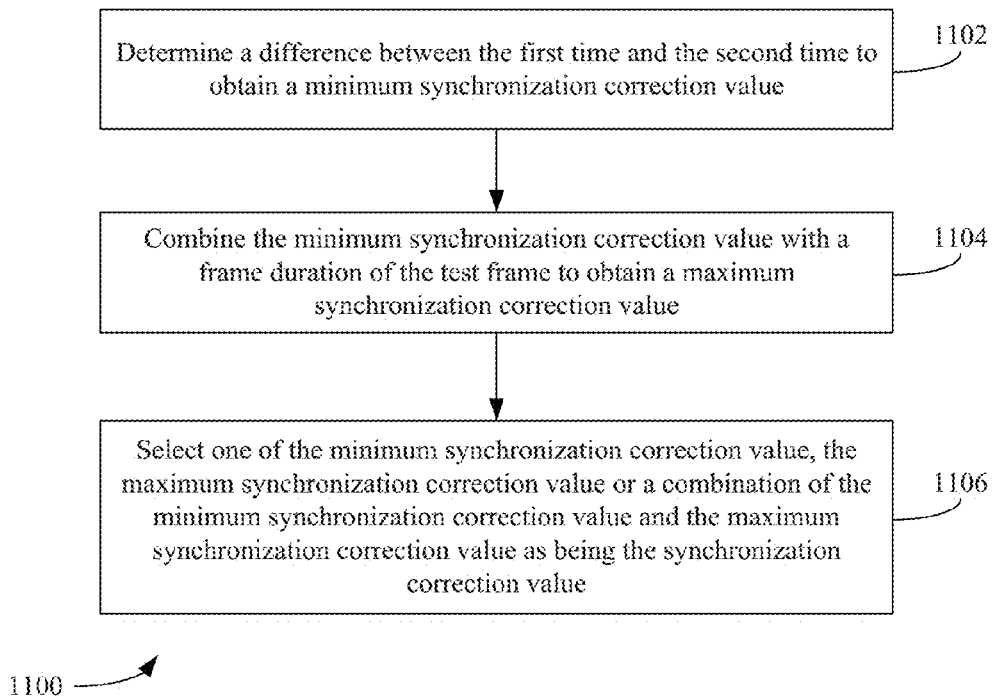
FIG. 11 shows a flowchart of a method for determining a synchronization correction value based at least on a first time at which a test frame is detected and a second time at which a test tone is detected in accordance with an embodiment.
Figure 12:
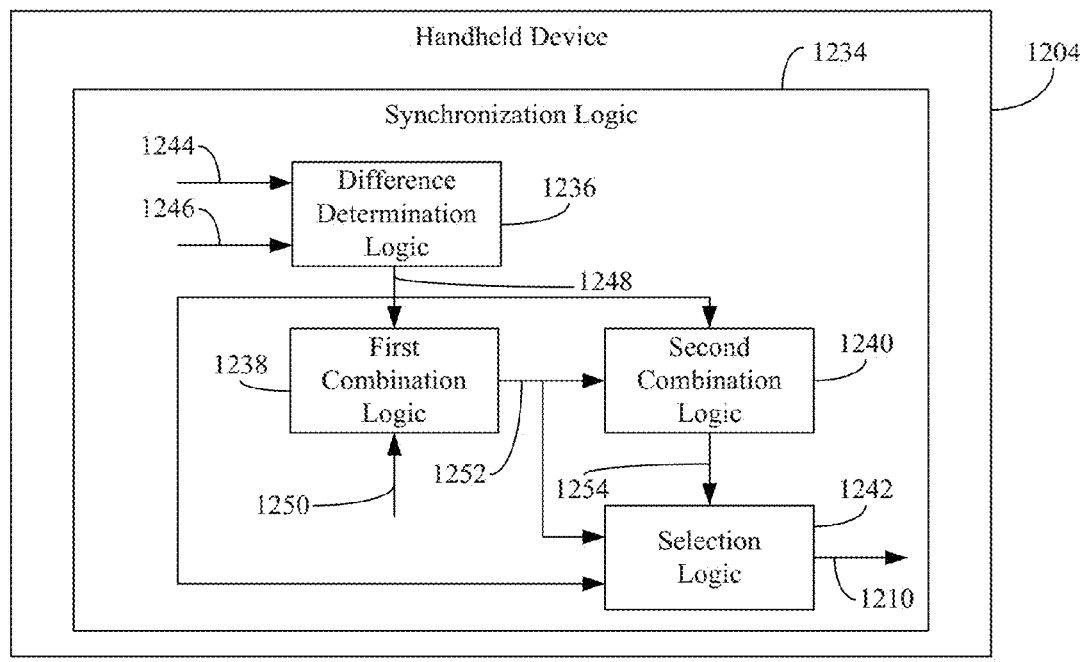
FIG. 12 depicts a block diagram of a handheld device in accordance with another embodiment.

In accordance with one or more embodiments, step 906 of flowchart 900 may be carried out according to the process shown in FIG. 11. Accordingly, FIG. 11 shows a flowchart 1100 of a method for determining a synchronization correction value based on at least on a first time at which a test frame is detected and a second time at which a test tone is detected in accordance with an embodiment. The method of flowchart 1100 may be implemented by handheld device 1204 shown in FIG. 12. FIG. 12 depicts a block diagram 1200 of handheld device 1204 in accordance with an embodiment. Handheld device 1204 may be an example of handheld device 1004, as shown in FIG. 10. As shown in FIG. 12, handheld device 1204 includes synchronization logic 1234. Synchronization logic 1234 may be an example of synchronization logic 1034, as shown in FIG. 10. Synchronization logic 1234 may include difference determination logic 1236, first combination logic 1238, second combination logic 1240, and selection logic 1242. Other structural and operational embodiments will be apparent to persons skilled in the relevant art(s) based on the following discussion regarding flowchart 1100 and handheld device 1204.

Flowchart 1100 begins with step 1102. At step 1102, a difference between the first time and the second time is determined to obtain a minimum synchronization correction value. For example, with reference to FIG. 12, difference determination logic 1236 determines a difference between first time 1244 and second time 1246 to obtain minimum synchronization correction value 1248. First time 1244 and second time 1246 may be determined and provided by determination logic 1032, as shown in FIG. 10.

At step 1104, the minimum synchronization correction value is combined with a frame duration of the test frame to obtain a maximum synchronization correction value. For example, with reference to FIG. 12, first combination logic 1238 combines minimum synchronization correction value 1248 with a known frame duration 1250 of the test frame to obtain a maximum synchronization correction value 1252. In accordance with one or more embodiments, first combination logic 1238 combines minimum synchronization correction value 1248 with known frame duration 1250 by adding minimum synchronization correction value 1248 with known frame duration 1250.

At step 1106, one of the minimum synchronization correction value, the maximum synchronization correction value or a combination of the minimum synchronization correction value and the maximum synchronization correction value is selected as being the synchronization correction value. For example, with reference to FIG. 12, selection logic 1242 selects one of minimum synchronization correction value 1248, maximum synchronization correction value 1252 or a combination 1254 of minimum synchronization correction value 1248 and maximum synchronization correction value 1252 as being synchronization correction value 1210. Combination 1254 may be generated by second combination logic 1240, which combines minimum synchronization correction value 1248 and maximum synchronization correction value 1252. In accordance with one or more embodiments, second combination logic 1240 combines minimum synchronization correction value 1248 and maximum synchronization correction value 1252 by taking an average of minimum synchronization correction value 1248 and maximum synchronization correction value 1252.

In some example embodiments, one or more of operations 1102, 1104, and/or 1106 of flowchart 1100 may not be performed. Moreover, operations in addition to or in lieu of operations 1102, 1104, and/or 1106 may be performed. Further, in some example embodiments, one or more of operations 1102, 1104, and/or 1106 may be performed out of order, in an alternate sequence, or partially (or completely) concurrently with each other or with other operations.

Figure 13:
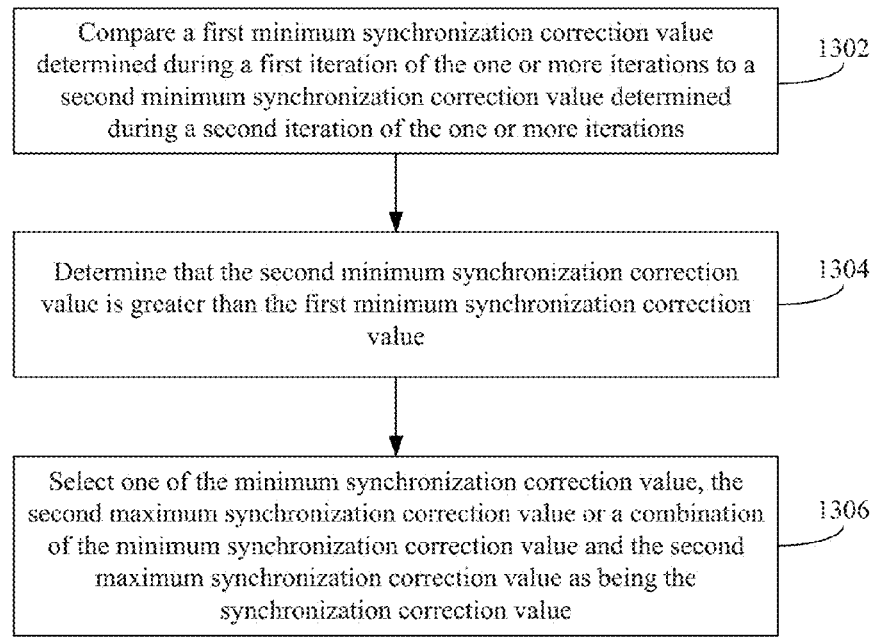
FIG. 13 shows a flowchart of a method for refining a minimum synchronization correction value in accordance with an embodiment.
Figure 14:
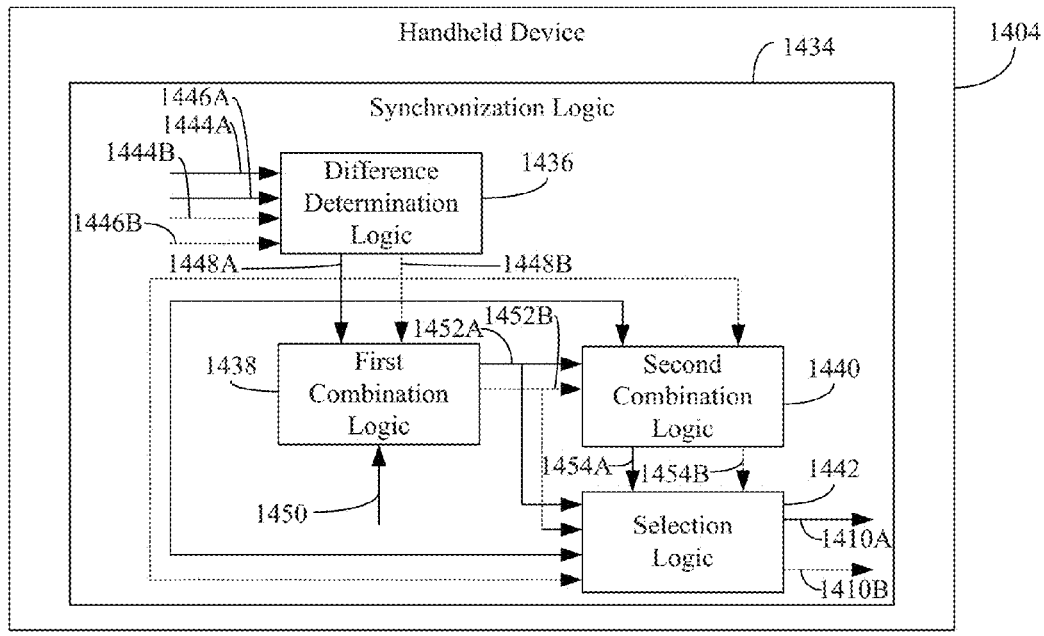
FIG. 14 depicts a block diagram of a handheld device in accordance with another embodiment.

In accordance with one or more embodiments, the minimum synchronization correction value determined in step 1102 of flowchart 1100 may be refined (e.g., updated) with each iteration performed for the calibration process. Accordingly, FIG. 13 shows a flowchart 1300 of a method for refining the minimum synchronization correction value in accordance with an embodiment. The method of flowchart 1300 may be implemented by handheld device 1404 shown in FIG. 14. FIG. 14 depicts a block diagram 1400 of handheld device 1404 in accordance with an embodiment. Handheld device 1404 may be an example of handheld device 1204, as shown in FIG. 12. As shown in FIG. 14, handheld device 1404 includes synchronization logic 1434. Synchronization logic 1434 may be an example of synchronization logic 1234, as shown in FIG. 12. Synchronization logic 1434 may include difference determination logic 1436, first combination logic 1438, second combination logic 1440, and selection logic 1442. Difference determination logic 1436, first combination logic 1438, second combination logic 1440, and selection logic 1442 may be an example of difference determination logic 1236, first combination logic 1238, second combination logic 1240, and selection logic 1242, as respectively shown in FIG. 12. It is noted that reference numerals in FIG. 14 that are followed by an 'A' indicate values determined during a first iteration of the calibration process and reference numerals that are followed by a "B" indicate values determined during a second iteration of the calibration process. Other structural and operational embodiments will be apparent to persons skilled in the relevant art(s) based on the following discussion regarding flowchart 1300 and handheld device 1404.

Flowchart 1300 begins with step 1302. At step 1302, a first minimum synchronization correction value determined during a first iteration of the one or more iterations is compared to a second minimum synchronization correction value determined during a second iteration of the one or more iterations. For example, as shown in FIG. 14, difference determination logic 1436 determines a first minimum synchronization correction value 1448A determined during the first iteration and a second minimum synchronization correction value 1448B determined during the second iteration. Difference determination logic 1436 may determine first minimum synchronization correction value 1448A based on a determined first time 1444A at which a test frame is detected and a determined second time 1446A at which a test tone is detected during the first iteration in a similar manner as described above with reference to steps 902 and 904 of FIG. 9. Difference determination logic 1436 may determine second minimum synchronization correction value 1448B based on a determined first time 1444B at which a test frame is detected and a determined second time 1446B at which a test tone is detected during the second iteration in a similar manner as described above with reference to steps 902 and 904 of FIG. 9.

At step 1304, it is determined that the second minimum synchronization correction value is greater than the first minimum synchronization correction value. For example, selection logic 1442 may determine that second minimum synchronization correction value 1448B is greater than first minimum synchronization correction value 1448A.

At step 1306, one of the second minimum synchronization correction value, the maximum synchronization correction value or a combination of the second minimum synchronization correction value and the maximum synchronization correction value is selected as being the synchronization correction value. For example, with reference to FIG. 14, selection logic 1442 selects one of second minimum synchronization correction 1448B, the maximum synchronization correction value (i.e., a first maximum synchronization correction value 1452A determined during the first iteration, or a combination (i.e., combination 1452B) of second minimum synchronization correction value 1448B and first maximum synchronization correction value 1452A as being synchronization correction value 1410B. It is noted that combination 1452B is determined during the second iteration of the calibration process due to the fact that it requires second minimum synchronization correction value 1448B. It is further noted that maximum synchronization correction value 1452A is used during the selection operation of step 1306 (and not second maximum synchronization correction value 1452B) because second maximum synchronization correction value 1452B is a greater value than first maximum synchronization correction value 1452A. This is so due to the fact that the combination of second minimum synchronization correction value 1448B and known frame duration 1450 of the test frame yields a greater value than the combination of first minimum synchronization correction value $1448A_1$ and known frame duration 1450. As described above with reference to FIGS. 2-8, the maximum synchronization correction value is only refined if a maximum synchronization correction value determined during a particular iteration of the calibration process is less than a maximum synchronization correction value determined during a previous iteration of the calibration process.

In some example embodiments, one or more of operations 1302, 1304, and/or 1306 of flowchart 1300 may not be performed. Moreover, operations in addition to or in lieu of operations 1302, 1304, and/or 1306 may be performed. Further, in some example embodiments, one or more of operations 1302, 1304, and/or 1306 may be performed out of order, in an alternate sequence, or partially (or completely) concurrently with each other or with other operations.

Figure 15:
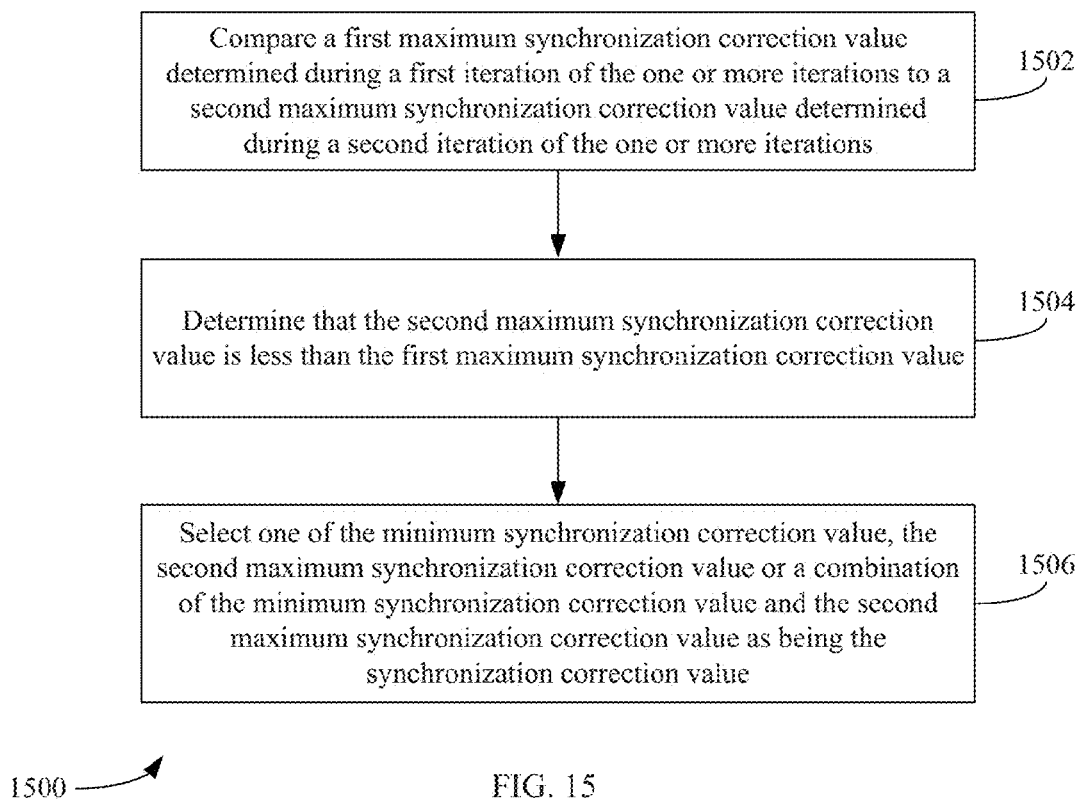
FIG. 15 shows a flowchart of a method for refining a maximum synchronization correction value in accordance with an embodiment.

In accordance with one or more embodiments, the maximum synchronization correction value determined in step 1104 of flowchart 1100 may refined (e.g., updated) with each iteration performed for the calibration process. FIG. 15 shows a flowchart 1500 of a method for refining the maximum synchronization correction value in accordance with an embodiment. The method of flowchart 1500 may be implemented by handheld device 1404 shown in FIG. 14. Other structural and operational embodiments will be apparent to persons skilled in the relevant art(s) based on the following discussion regarding flowchart 1500 and handheld device 1404.

Flowchart 1500 begins with step 1502. At step 1502, a first maximum synchronization correction value determined during a first iteration of the one or more iterations is compared to a second maximum synchronization correction value determined during a second iteration of the one or more iterations. For example, as shown in FIG. 14, selection logic 1442 compares first maximum synchronization correction value 1452A to second maximum synchronization correction value 1452B. First combination logic 1438 determines first maximum synchronization correction value 1452A based on a combination of minimum synchronization correction value 1448A and known frame duration 1450, and determines second maximum synchronization correction value 1452B based on a combination of minimum synchronization correction value 1448B and known frame duration 1450.

At step 1504, it is determined that the second maximum synchronization correction value is less than the first maximum synchronization correction value. For example, selection logic 1442 may determine that second maximum synchronization correction value 1452B is less than first maximum synchronization correction value 1452A.

At step 1506, one of the minimum synchronization correction value, the second maximum synchronization correction value or a combination of the minimum synchronization correction value and the second maximum synchronization correction value is selected as being the synchronization correction value. For example, with reference to FIG. 14, selection logic 1442 selects one of the minimum synchronization correction value (i.e., first minimum synchronization correction value 1448A), second maximum synchronization correction value 1452B, or a combination (i.e., combination 1454B) of first minimum synchronization correction value 1448A and second maximum synchronization correction value 1452B as being synchronization correction value 1410B. It is noted that combination 1454B is determined during the second iteration of the calibration process due to the fact that it requires second maximum synchronization correction value 1452B. It is further noted that first minimum synchronization correction value 1448A is used during the selection operation of step 1506 (and not second minimum synchronization correction value 1448B) because second minimum synchronization correction value 1448B is a lesser value than first minimum synchronization correction value 1448A. As described above with reference to FIGS. 2-8, 13, and 14, the minimum synchronization correction value is only refined if a minimum synchronization correction value determined during a particular iteration of the calibration process is greater than a minimum synchronization correction value determined during a previous iteration of the calibration process.

In some example embodiments, one or more of operations 1502, 1504, and/or 1506 of flowchart 1500 may not be performed. Moreover, operations in addition to or in lieu of operations 1502, 1504, and/or 1506 may be performed. Further, in some example embodiments, one or more of operations 1502, 1504, and/or 1506 may be performed out of order, in an alternate sequence, or partially (or completely) concurrently with each other or with other operations.

Further Example Embodiments

A device, as defined herein, is a machine or manufacture as defined by 35 U.S.C. §101. Devices may be digital, analog or a combination thereof. Devices may include integrated circuits (ICs), one or more processors (e.g., central processing units (CPUs), microprocessors, digital signal processors (DSPs), etc.) and/or may be implemented with any semiconductor technology, including one or more of a Bipolar Junction Transistor (BJT), a heterojunction bipolar transistor (HBT), a metal oxide field effect transistor (MOSFET) device, a metal semiconductor field effect transistor (MESFET) or other transconductor or transistor technology device. Such devices may use the same or alternative configurations other than the configuration illustrated in embodiments presented herein.

Techniques and embodiments, including methods, described herein may be implemented in hardware (digital and/or analog) or a combination of hardware and software and/or firmware. Techniques described herein may be implemented in one or more components. Embodiments may comprise computer program products comprising logic (e.g., in the form of program code or instructions as well as firmware) stored on any computer useable storage medium, which may be integrated in or separate from other components. Such program code, when executed in one or more processors, causes a device to operate as described herein. Devices in which embodiments may be implemented may include storage, such as storage drives, memory devices, and further types of computer-readable media. Examples of such computer-readable storage media include, but are not limited to, a hard disk, a removable magnetic disk, a removable optical disk, flash memory cards, digital video disks, random access memories (RAMs), read only memories (ROM), and the like. In greater detail, examples of such computer-readable storage media include, but are not limited to, a hard disk associated with a hard disk drive, a removable magnetic disk, a removable optical disk (e.g., CDROMs, DVDs, etc.), zip disks, tapes, magnetic storage devices, MEMS (microelectromechanical systems) storage, nanotechnology-based storage devices, as well as other media such as flash memory cards, digital video discs, RAM devices, ROM devices, and the like. Such computer-readable storage media may, for example, store computer program logic, e.g., program modules, comprising computer executable instructions that, when executed, provide and/or maintain one or more aspects of functionality described herein with reference to the figures, as well as any and all components, steps and functions therein and/or further embodiments described herein.

Computer readable storage media are distinguished from and non-overlapping with communication media. Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wired media as well as wireless media such as acoustic, RF, infrared and other wireless media. Example embodiments are also directed to such communication media.

The calibration process performed to synchronize an audio signal and a video signal and/or any further systems, sub-systems, and/or components disclosed herein may be implemented in hardware (e.g., hardware logic/electrical circuitry), or any combination of hardware with software (computer program code configured to be executed in one or more processors or processing devices) and/or firmware.

Figure 16:
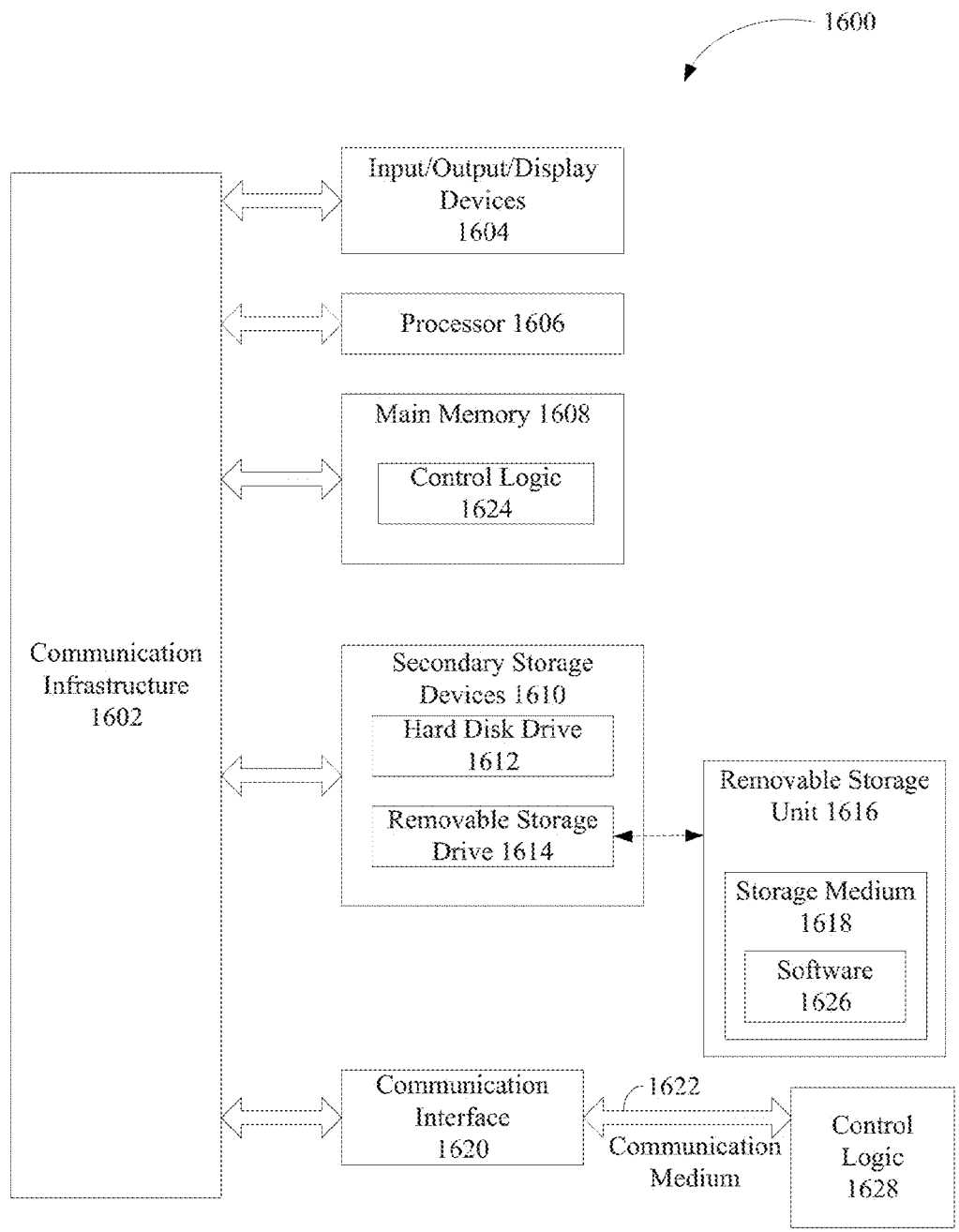
FIG. 16 is a block diagram of a computer system in accordance with an embodiment.

The embodiments described herein, including systems, methods/processes, and/or apparatuses, may be implemented using well known processing devices, telephones (smart phones and/or mobile phones), servers, electronic devices (e.g., consumer electronic devices) and/or, computers, such as a computer 1600 shown in FIG. 16. It should be noted that computer 1600 may represent communication devices, processing devices, servers, and/or traditional computers in one or more embodiments. For example, handheld device 104, handheld device 204, handheld device 1004, handheld device 1204, and handheld device 1404 (as respectively shown in FIGS. 1, 2, 10, 12, and 14), entertainment system 102 and entertainment system 202 (as respectively shown in FIGS. 1 and 2), any of the sub-systems, components or sub-components respectively contained therein, may be implemented using one or more computers 1600.

Computer 1600 can be any commercially available and well known communication device, processing device, and/or computer capable of performing the functions described herein, such as devices/computers available from International Business Machines®, Apple®, Sun®, HP®, Dell®, Cray®, Samsung®, Nokia®, etc. Computer 1400 may be any type of computer, including a desktop computer, a server, etc.

Computer 1600 includes one or more processors (also called central processing units, or CPUs), such as a processor 1606. Processor 1606 is connected to a communication infrastructure 1602, such as a communication bus. In some embodiments, processor 1606 can simultaneously operate multiple computing threads.

Computer 1600 also includes a primary or main memory 1608, such as random access memory (RAM). Main memory 1608 has stored therein control logic 1624 (computer software), and data.

Computer 1600 also includes one or more secondary storage devices 1610. Secondary storage devices 1610 include, for example, a hard disk drive 1612 and/or a removable storage device or drive 1614, as well as other types of storage devices, such as memory cards and memory sticks. For instance, computer 1600 may include an industry standard interface, such a universal serial bus (USB) interface for interfacing with devices such as a memory stick. Removable storage drive 1614 represents a floppy disk drive, a magnetic tape drive, a compact disk drive, an optical storage device, tape backup, etc.

Removable storage drive 1614 interacts with a removable storage unit 1616. Removable storage unit 1616 includes a computer useable or readable storage medium 1618 having stored therein computer software 1626 (control logic) and/or data. Removable storage unit 1616 represents a floppy disk, magnetic tape, compact disk, DVD, optical storage disk, or any other computer data storage device. Removable storage drive 1614 reads from and/or writes to removable storage unit 1616 in a well-known manner.

Computer 1600 also includes input/output/display devices 1604, such as touchscreens, LED and LCD displays, monitors, keyboards, pointing devices, etc.

Computer 1600 further includes a communication or network interface 1618. Communication interface 1620 enables computer 1600 to communicate with remote devices. For example, communication interface 1620 allows computer 1600 to communicate over communication networks or mediums 1622 (representing a form of a computer useable or readable medium), such as LANs, WANs, the Internet, etc. Network interface 1620 may interface with remote sites or networks via wired or wireless connections.

Control logic 1628 may be transmitted to and from computer 1600 via the communication medium 1622.

Any apparatus or manufacture comprising a computer useable or readable medium having control logic (software) stored therein is referred to herein as a computer program product or program storage device. This includes, but is not limited to, computer 1600, main memory 1608, secondary storage devices 1610, and removable storage unit 1616. Such computer program products, having control logic stored therein that, when executed by one or more data processing devices, cause such data processing devices to operate as described herein, represent embodiments of the invention.

Any apparatus or manufacture comprising a computer useable or readable medium having control logic (software) stored therein is referred to herein as a computer program product or program storage device. This includes, but is not limited to, a computer, computer main memory, secondary storage devices, and removable storage units. Such computer program products, having control logic stored therein that, when executed by one or more data processing devices, cause such data processing devices to operate as described herein, represent embodiments of the inventive techniques described herein.

CONCLUSION

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described exemplary embodiments, but should be defined only in accordance with the following claims and their equivalents.

What is claimed is:

1. A method in a handheld device, comprising:
performing one or more iterations of a calibration process to obtain a synchronization correction value for synchronizing an audio signal and a video signal, wherein each of the one or more iterations comprises:
determining a first time at which a test frame included in video content representative of the video signal is detected;
determining a second time at which a test tone included in audio content representative of the audio signal is detected;
determining a difference between the first time and the second time to obtain a minimum synchronization correction value; and combining the minimum synchronization correction value with a frame duration of the test frame to obtain a maximum synchronization correction value;

determining the synchronization correction value based on at least one of the minimum synchronization correction value and the maximum synchronization correction value; and providing the synchronization correction value to another device.

2. The method of claim 1, further comprising:

comparing a first minimum synchronization correction value determined during a first iteration of the one or more iterations to a second minimum synchronization correction value determined during a second iteration of the one or more iterations;

determining that the second minimum synchronization correction value is greater than the first minimum synchronization correction value; and determining the synchronization correction value based on at least one of the second minimum synchronization correction value and the maximum synchronization correction value.

3. The method of claim 1, further comprising:

comparing a first maximum synchronization correction value determined during a first iteration of the one or more iterations to a second maximum synchronization correction value determined during a second iteration of the one or more iterations;

determining that the second maximum synchronization correction value is less than the first maximum synchronization correction value; and determining the synchronization correction value based on at least one of the minimum synchronization correction value and the second maximum synchronization correction value.

4. The method of claim 1, wherein the test frame is detected by a camera of the handheld device, and wherein the test tone is detected by a microphone of the handheld device.

5. The method of claim 1, wherein a time between said performing of each of the one or more iterations of the calibration process is based at least in part on the maximum synchronization correction value.

6. The method of claim 1, wherein the audio signal and the video signal originate from a same source.

7. The method of claim 1, wherein a duration of the test tone is the same as a duration of the test frame.

8. A handheld device, comprising:
a camera;
a microphone; and
control logic configured to:
perform one or more iterations of a calibration process to obtain a synchronization correction value for synchronizing an audio signal and a video signal, wherein for each of the one or more iterations, the control logic is configured:
determine a first time at which a test frame included in video content representative of the video signal is detected by the camera;
determine a second time at which a test tone included in audio content representative of the audio signal is detected by the microphone;
determine a difference between the first time and the second time to obtain a minimum synchronization correction value; and combine the minimum synchronization correction value with a frame duration of the test frame to obtain a maximum synchronization correction value;

determine the synchronization correction value based on at least one of the minimum synchronization correction value and the maximum synchronization correction value; and provide the synchronization correction value to another device.

9. The handheld device of claim 8, wherein the control logic is further configured to:

compare a first minimum synchronization correction value determined during a first iteration of the one or more iterations to a second minimum synchronization correction value determined during a second iteration of the one or more iterations;

determine that the second minimum synchronization correction value is greater than the first minimum synchronization correction value; and determine the synchronization correction value based on at least one of the second minimum synchronization correction value and the maximum synchronization correction value.

10. The handheld device of claim 8, wherein the control logic is further configured to:

compare a first maximum synchronization correction value determined during a first iteration of the one or more iterations to a second maximum synchronization correction value determined during a second iteration of the one or more iterations;

determine that the second maximum synchronization correction value is less than the first maximum synchronization correction value; and determine the synchronization correction value based on at least one of the minimum synchronization correction value or the second maximum synchronization correction value.

11. The handheld device of claim 8, wherein a time between said performing of each of the one or more iterations of the calibration process is based at least in part on the maximum synchronization correction value.

12. The handheld device of claim 8, wherein the audio signal and the video signal originate from a same source.

13. The handheld device of claim 8, wherein a duration of the test tone is the same as a duration of the test frame.

14. A system, comprising:
one or more processors; and
a memory containing a program, which, when executed by the one or more processors, is configured to perform a process configured to:
perform one or more iterations of a calibration process to obtain a synchronization correction value for synchronizing an audio signal and a video signal, wherein for each of the one or more iterations, the process is configured to:
determine a first time at which a test frame included in video content representative of the video signal is detected;
determine a second time at which a test tone included in audio content representative of the audio signal is detected;
determine a difference between the first time and the second time to obtain a minimum synchronization correction value; and combine the minimum synchronization correction value with a frame duration of the test frame to obtain a maximum synchronization correction value;

determine the synchronization correction value based on at least one of the minimum synchronization correction value and the maximum synchronization correction value; and provide the synchronization correction value to another device.

15. The system of claim 14, the process further configured to:

compare a first minimum synchronization correction value determined during a first iteration of the one or more iterations to a second minimum synchronization correction value determined during a second iteration of the one or more iterations;

determine that the second minimum synchronization correction value is greater than the first minimum synchronization correction value; and determine the synchronization correction value based on at least one of the second minimum synchronization correction value and the maximum synchronization correction value.

16. The system of claim 14, the process further configured to:

compare a first maximum synchronization correction value determined during a first iteration of the one or more iterations to a second maximum synchronization correction value determined during a second iteration of the one or more iterations;

determine that the second maximum synchronization correction value is less than the first maximum synchronization correction value; and determine the synchronization correction value based on at least one of the minimum synchronization correction value and the second maximum synchronization correction value.

17. The system of claim 14, wherein a time between said performing of each of the one or more iterations of the calibration process is based at least in part on the maximum synchronization correction value.

18. The system of claim 14, wherein the audio signal and the video signal originate from a same source.

19. The system of claim 14, wherein the test frame is detected by a camera of the system, and wherein the test tone is detected by a microphone of the system.

20. The system of claim 14, wherein a duration of the test tone is the same as a duration of the test frame.

* * * * *

UNITED STATES PATENT AND TRADEMARK OFFICE
CERTIFICATE OF CORRECTION

PATENT NO.        : 9,838,584 B2                                              Page 1 of 1
APPLICATION NO.   : 14/945233
DATED             : December 5, 2017
INVENTOR(S)       : Siddharth Kumar et al.

It is certified that error appears in the above-identified patent and that said Letters Patent is hereby corrected as shown below:

On the Title Page

In item (60), in Column 1, under "Related U.S. Application Data", Line 1, delete "62/018,423," and insert -- 62/081,423, --, therefor.

Signed and Sealed this
Twenty-ninth Day of May, 2018

Andrei Iancu
*Director of the United States Patent and Trademark Office*